Oct. 2, 1956
R. J. BROWN
2,764,996
MULTIPLE RANGE PRESSURE REGULATOR
Filed June 7, 1952
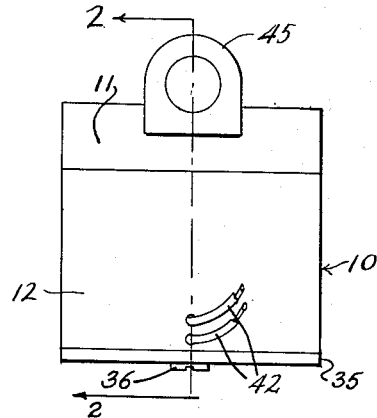
FIG. 1
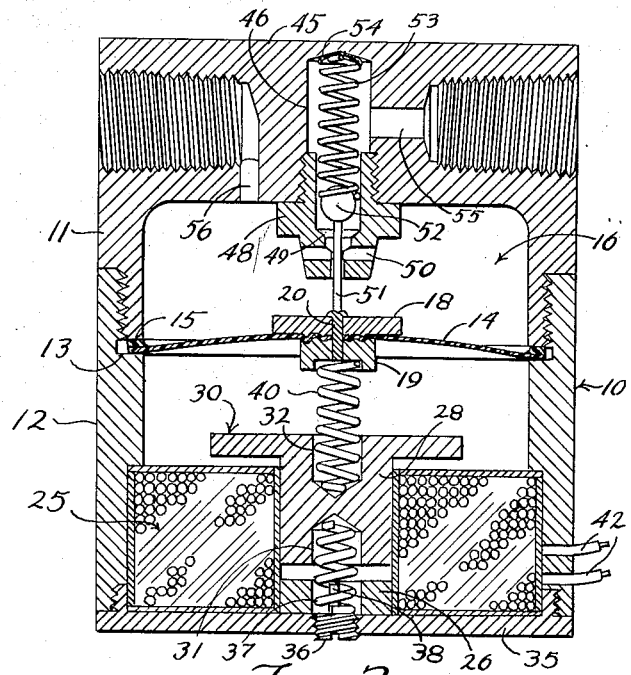
FIG. 2
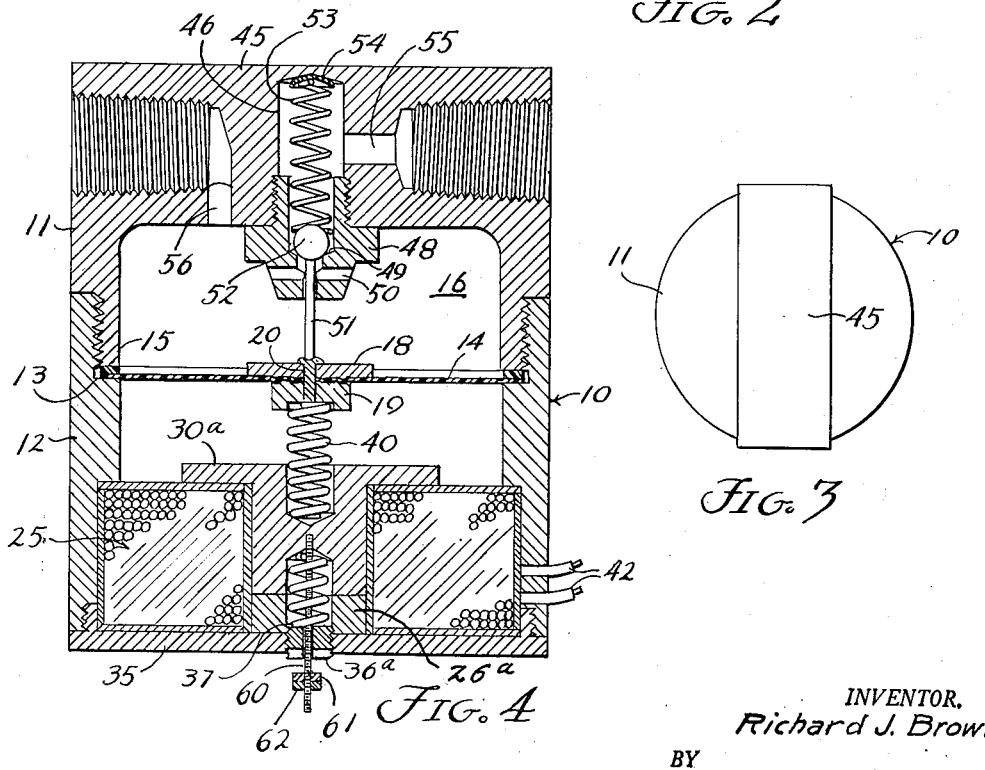
FIG. 3
FIG. 4
INVENTOR.
Richard J. Brown
BY
West & Oldham
ATTYS.

United States Patent Office 2,764,996
Patented Oct. 2, 1956

2,764,996

MULTIPLE RANGE PRESSURE REGULATOR

Richard J. Brown, Cleveland, Ohio, assignor, by mesne assignments, to Hupp Corporation, Detroit, Mich., a corporation of Virginia Application June 7, 1952, Serial No. 292,271

8 Claims. (Cl. 137—790)

This invention is a flow control device wherein are combined the functions of a metering valve and a pressure regulator. The device is intended especially for use in the fuel supply line of a liquid fuel burner between the burner and a pump, particularly a pump of piston, diaphragm or similar type, by which the fuel is impelled to the burner.

Pressure created by pumps of the types mentioned is invariably erratic or irregular. However, such pumps are peculiarly adapted to oil burning apparatus of the class wherein the present invention is principally intended for use, and they produce relatively low pressures for the handling of which the device of this invention is especially designed.

A specific instance of the use of the invention is in automatic heating apparatus for installation on automotive vehicles for heating the engines to facilitate starting in extremely cold weather and for maintaining a comfortable temperature in the personnel compartments of such vehicles. Apparatuses of the kind referred to are disclosed in Letters Patent No. 2,500,663, dated March 14, 1950, and in a copending application filed by Allen E. Cleveland on September 8, 1948, Serial No. 48,312, now Patent No. 2,652,106, dated September 15, 1953. In each of these instances liquid fuel is impelled to a burner by a diaphragm pump, and the operation of the apparatus is rendered automatic by an electrical ignition and control system.

The device of the present invention involves an electrical actuator which especially adapts the device for use in such a system.

One object of my invention is to provide a relatively simple and reliable device for effecting delivery of fuel to a burner at any selected one of a plurality of substantially definite rates of flow, thereby to produce fires of different volume; and for maintaining an approximately even feeding pressure at each rate of flow so as to insure a steady fire of the volume corresponding to such rate. It is evident that, without such pressure regulation, the purpose of an automatic control system would, to a considerable extent, be defeated. For instance, if the feeding of the fuel to the burner were irregular or erratic at any setting of the valve, the action of the burner would be spasmodic and difficult to control.

As I have pointed out above, the invention involves an electrical actuator, and this actuator shifts the valve between positions for effecting different rates of flow; and it is another object of my invention to so constitute the device that it will effect delivery of fuel to the burner at a relatively high or maximum rate of controlled flow at the time said electrical actuator is deenergized. This, incidentally, is synchronized with the energization of the electrical igniter employed in apparatus of the class above mentioned for lighting the fuel thus delivered to the burner, whereby drain on the electrical supply system is minimized during the starting or ignition phase. Obviously, this is highly desirable in heating systems for automotive vehicles where the electrical energy is derived from storage batteries.

Another object of my invention is to provide a multiple range flow control device and pressure regulator that is operated by a single electromagnetic means or solenoid.

Another object is to provide, in the device of my invention, an adjustable means that is simple and convenient of manipulation for varying the operating range of the device.

Another object of the invention is to provide a construction that will allow easy substitution or replacement of certain of the parts as for the purpose of repair or in order to effect a desired change in the ratio of operating pressures.

Another object of the invention is to provide stop means, desirably adjustable, for limiting the movement of the valve away from its seat thereby to definitely fix the maximum or "high fire" rate of flow; and which means, in the form herein disclosed, may be utilized for shifting the valve beyond its normal range of movement for the purpose of purging the liquid conveying parts of the device.

The foregoing objects are attained in the embodiments of the invention illustrated in the accompanying drawing, and while I shall proceed to describe these embodiments in detail I wish it to be understood that I do not limit myself thereto further than is required by the terms of the appended claims.

In the drawings, wherein like parts are designated by like reference characters throughout the several views, Fig. 1 is an elevational view of the multiple range flow control means and pressure regulator of my invention;

Fig. 2 is an enlarged section on the line 2—2 of Fig. 1, the parts being illustrated as they would appear when the electrical actuator is deenergized and the valve accordingly positioned for effecting the maximum or "high fire" rate of flow;

Fig. 3 is a plan view, drawn to the same scale as Fig. 1, and

Fig. 4 is a sectional view, similar to Fig. 2, showing a modification of the invention, and illustrating the device as though the electrical actuator were energized and the valve positioned to effect minimum or "low fire" rate of flow.

According to the present embodiment of the invention, the device comprises a walled structure or casing 10 that is made up of a head 11 and a body 12. The major portion of the head and the body are cylindrical and of the same diameter and the lower end of the head is of reduced diameter and externally threaded for screw connection with the complemental upper end of the body. By forming the upper end of the body as illustrated, an internal annular shoulder 13 is provided between which and the reduced lower end of the head 11 is firmly clamped the peripheral portion of a circular diaphragm 14 and a gasket 15. Thus the diaphragm 14 forms a flexible or movable wall of a flow chamber 16 that is enclosed by the head 11. The central portion of the diaphragm is clamped between a disc 18 and a spring seat 19, the latter being shown as having a central stud 20 that projects upwardly through an aperture in the diaphragm and through a central hole of the disc 18 and is turned over or riveted above the disc to bind the parts together, the stud 20 being shown as slightly recessed at its upper end.

The lower portion of the interior of the body 12 is enlarged to receive the coil of an electromagnetic means or solenoid that is designated generally by the reference numeral 25. Fixed within the lower end of the opening of the coil is an annular pole piece 26, and slidable in said opening above the pole piece is the cylindrical portion 28 of an armature that is designated, generally, by the reference numeral 30. Opening through the lower end of the portion 28 of the armature is an axial recess 31, and a similar recess 32 opens through the top of the armature.

A circular closure 35 has screw connection with the lower end of the body 12 and serves to hold the coil of the electromagnetic means or solenoid in place, and an adjusting screw 36 is threaded through a central tapped hole of the closure in alignment with the opening of the pole piece 26 and the recess 31. A helical spring 37 is disposed between the screw 36 and the top wall of the recess 31, the screw being shown as having a stud 38 that projects into the axial opening of the spring. Another helical spring 40 is engaged at its lower end within the recess 32 of the armature 30 and has its upper end disposed within a depression in the lower face of the spring seat 19. When the electromagnetic means or solenoid 25 is deenergized, the armature 30 is supported in the position shown in Fig. 2 by the spring 37, and through the medium of the spring 40, the central portion of the diaphragm 14 is held at its maximum elevation, assuming no counteracting pressure prevails in the flow chamber 16. Obviously the compression of the springs 37 and 40 may be changed by adjusting the screw 36. The terminal wires 42 of the coil of the electromagnetic means or solenoid 25 extend through openings in the peripheral wall of the body 12.

Shown as formed integral with and as extending diametrically across the circular top wall of the head 11 is a ridge or boss 45. A recess or bore 46 occupies the central region of the ridge 45 and opens through the top wall of the head 11 into the flow chamber 16, centrally thereof. The recess 46 is threaded adjacent its inner end to receive the threaded extension of a valve housing 48. This housing has a bore of relatively large diameter throughout its upper portion, but it is reduced below such portion to provide an orifice of suitable size that is surrounded by a valve seat 49 wherewith a movable valve member, later to be described, cooperates. Immediately below said orifice, the valve housing is provided with a transverse bore 50, and below the latter the bore of the housing continues of a size to loosely receive the stem 51 of a valve 52, the latter being shown as spherical, and previously referred to as the movable valve member. The lower end of the valve stem 51 is engaged within the depression in the upper end of the previously mentioned stud 20. A relatively light, helical spring 53 is compressed between the valve and the top wall of the recess 46 and urges the valve toward the seat 49. A sheet metal cup 54 is shown as applied to the upper end of the spring 53 and it bears directly against the top wall of said recess. The ends of the ridge or boss 45 are recessed and internally threaded for the reception of conventional fittings by which pipe sections are adapted to be connected to the device. Leading from one such recess is an inlet passage 55 that communicates, through the previously mentioned recess 46 and the axial and transverse bores of the valve housing 48, with the flow chamber 16. An outlet port or passage 56 leads from said chamber 16 to the other end recess of the ridge 45.

The form of the invention illustrated in Fig. 4 is identical with that above described with the one exception that a stop means is provided, which is desirably adjustable, for positively limiting the upward movement of the armature 30 and, consequently, of the diaphragm and valve. Accordingly, all of the identical elements of the two forms of the invention are designated by the same reference characters. In the modification, the adjusting screw 36ª is provided with an axial bore through which, and the spring 37, a rod 60 extends. Screw connection is made between the upper end of said rod and the armature 30ª, and throughout its lower portion said rod 60 is threaded for the reception and adjustment of a stop nut 61 and a lock nut 62. By engagement of the stop nut 61 with the lower end of the screw 36ª, the upward movement of the armature, and of all parts sustained thereby, including the valve 52, is limited. Thus, in the present case, the position of the valve for effecting maximum or "high fire" rate of flow may be definitely fixed, and it may be changed at will by the adjustment of the stop nut along the rod 60, the lock nut 62 serving to secure the stop nut in any position of adjustment.

If it should be desired to lift the valve beyond operating range, as for the purpose of temporarily increasing the flow through the liquid conveying parts of the device for purging the same of sediment or other foreign matter, the nuts 61 and 62 are lowered beyond the reach of the screws 36ª nd the rod 60 forced upwardly to effect the abnormal movement of the valve.

It is evident from the foregoing description that when the electromagnetic means or solenoid 25 is deenergized, the armature 30 will be held in projected or elevated position by the spring 37. Likewise, through the intervention of the spring 40 and the central portion of the diaphragm 14 and the stem 51, the valve 52 will be sustained the maximum distance from the seat 49. Thus is established one so-called "localized range of movement" of the valve. Under these circumstances liquid admitted through the passage 55 will flow downwardly about the valve 52 and through the valve orifice and transverse bore 50 into the flow chamber 16 from which the liquid will escape through the outlet passage 56, it being understood, of course, that all of the beforementioned liquid conveying parts of the device are completely filled with liquid.

In the event that liquid is forced through the inlet passage 55 at unduly high pressure, this pressure will be transmitted to the diaphragm 14 and cause the central portion of the diaphragm to move downwardly in opposition to the springs 40 and 37, and as the parts carried by the diaphragm descend they will permit the valve 52, under the pressure of its spring 53, to more closely approach the seat 49, thus retarding the flow of liquid into the chamber 16. The retarding of the flow and the enlarging of the capacity of the flow chamber 16 by reason of the retraction of the diaphragm will absorb or compensate for the surge of liquid into the flow chamber, wherefore the liquid will continue on through the outlet port or passage 56 at what may be regarded substantially normal pressure. As the pressure of the incoming liquid subsides, the diaphragm will be returned to its former elevated position and the valve, in the meantime, will remain within the aforesaid localized range of movement, the flow, under these conditions, being the maximum or "high fire" rate of flow.

When the electromagnetic means or solenoid 25 is energized, as occurs during low fire condition of the apparatus in connection with which the device is primarily intended for use, the armature 30 is retracted, in opposition to the spring 37, to the position shown in Fig. 4. Under these conditions, the spring 40 and the central portion of the diaphragm descend, allowing the valve 52 to move to within a short distance of the seat 49 and assume what may be referred to as a second localized range of movement, thereby establishing minimum or "low fire" rate of flow. If, under these circumstances, a surge occurs in the liquid feeding pressure, the diaphragm will respond thereto and further lower the valve toward or upon its seat so as to retard or momentarily stop the flow to permit the pressure in the flow chamber 16 to resume normal condition. In the present case, as in the former one, the flow through the outlet port or passage 56 will be practically unaffected by the surge of fuel to the flow chamber.

While I have said that my invention is especially intended for use in connection with liquid fuel burners, and have so described it in the foregoing, it will be obvious to those skilled in the art that my multiple range pressure regulator is generally applicable to fluid fuel burning apparatus, including gas burners, where volume control is desirable for producing fires of different intensities, and fluctuating pressures are encountered.

It is to be understood, also, that the invention is susceptible to such changes and additional modifications as come within the terms of the claims appended hereto.

Having thus described my invention, what I claim is:

1. A device of the character described, comprising a structure including a diaphragm, two resilient biasing means sustained by said structure and arranged so as to be capable of imposing their combined expanding forces upon said diaphragm, and electromagnetic means operatively associated with one of said biasing means and acting, when energized, to restrain the last mentioned biasing means from expanding and adding its force to that of the other biasing means.

2. A device of the character described, comprising a structure including a diaphragm, an abutment incorporated in the structure and arranged in opposed relation to said diaphragm, a member movably sustained intermediate the diaphragm and said abutment, a first resilient biasing means interposed between the diaphragm and said member, a second resilient biasing means interposed between said member and the aforesaid abutment whereby the combined expanding forces of said resilient means, when under compression, are capable of being imposed upon the diaphragm, and electromagnetic means in operative association with said member and acting, when energized, to retract said member toward the abutment and hold it in retracted position thereby to restrain the second biasing means from expanding and adding its force to that of the first biasing means.

3. The combination and arrangement of parts set forth in claim 2, wherein the abutment is adjustable toward and from the diaphragm.

4. The combination and arrangement of parts set forth in claim 2, and, in addition thereto, manually operable means for imposing a thrust upon said member in the direction of the diaphragm.

5. A device of the character described, comprising a structure including a diaphragm, an abutment incorporated in the structure and arranged in opposed relation to said diaphragm, a member movably sustained intermediate the diaphragm and said abutment, a first helical spring interposed between the diaphragm and said member, a second helical spring interposed between said member and the abutment, said springs being in approximate axial alignment, and electromagnetic means operatively associated with said member and acting, when energized, to retract said member toward the abutment and hold it in retracted position in opposition to the expanding force of the second spring.

6. The combination and arrangement of parts set forth in claim 5, wherein the abutment is adjustable toward and from the diaphragm.

7. A device of the character described, comprising a structure including a diaphragm, an abutment incorporated in the structure and arranged in opposed relation to said diaphragm, electromagnetic means including an armature and coil, the armature being movably sustained intermediate the diaphragm and said abutment, a first helical spring interposed between the diaphragm and said armature, a second helical spring interposed between said armature and the abutment, the coil of said electromagnetic means surrounding the second spring and disposed in operative relation to the armature whereby, when the electromagnetic means is energized, the armature will be retracted toward the abutment and held in retracted position thereby to confine the second spring against expansion.

8. The combination and arrangement of parts set forth in claim 7, wherein said abutment is provided with an axial hole, and a rod extending through said hole and engaged with the armature and by means of which the armature may be thrust toward the diaphragm.

References Cited in the file of this patent
UNITED STATES PATENTS

| | | |
|---|---|---|
| 1,049,845 | Geissinger | Jan. 7, 1913 |
| 1,079,600 | Kennedy | Nov. 25, 1913 |
| 1,324,084 | Tolman | Dec. 9, 1919 |
| 1,731,519 | Bastian | Oct. 15, 1929 |
| 2,212,762 | Wittmann | Aug. 27, 1940 |
| 2,219,441 | Carnes | Oct. 29, 1940 |
| 2,366,006 | Culver | Dec. 26, 1944 |
| 2,437,468 | Hunter | Mar. 9, 1948 |
| 2,447,067 | Hamilton | Aug. 17, 1948 |
| 2,449,438 | Wisegarver | Sept. 14, 1948 |
| 2,477,720 | Caserta | Aug. 2, 1949 |
| 2,642,083 | Strong | June 16, 1953 |